United States Patent
Beer et al.

(10) Patent No.: US 8,434,633 B2
(45) Date of Patent: May 7, 2013

(54) ONE-WAY VALVE FOR FLEXIBLE PACKAGE AND PACKAGE INCLUDING A ONE-WAY VALVE

(75) Inventors: Jeffrey Scott Beer, Coopersburg, PA (US); Barry Pritchard, Nazareth, PA (US); John S. Thomas, Coopersburg, PA (US)

(73) Assignee: Fres-co System USA, Inc., Telford, PA (US)

( * ) Notice: Subject to any disclaimer, the term of this patent is extended or adjusted under 35 U.S.C. 154(b) by 513 days.

(21) Appl. No.: 12/361,111

(22) Filed: Jan. 28, 2009

(65) Prior Publication Data

US 2010/0187230 A1 Jul. 29, 2010

(51) Int. Cl.
B65D 81/20 (2006.01)
B65D 90/36 (2006.01)

(52) U.S. Cl.
USPC ............... 220/89.1; 206/524.8; 220/203.1

(58) Field of Classification Search ............ 220/89.1, 220/203.1; 137/854, 859, 852, 843; 383/210; 206/524.8

See application file for complete search history.

(56) References Cited

U.S. PATENT DOCUMENTS

| 3,595,467 A | 7/1971 | Goglio |
| 3,799,427 A | 3/1974 | Goglio |
| 4,420,015 A | 12/1983 | Blaser |
| 4,444,219 A | 4/1984 | Hollenstein |
| 4,576,285 A | 3/1986 | Goglio |
| 4,705,174 A | 11/1987 | Goglio |
| 5,228,839 A * | 7/1993 | Peterson et al. ............... 417/174 |
| 5,711,656 A * | 1/1998 | Tsai ............................... 417/312 |
| 6,056,439 A * | 5/2000 | Graham .......................... 383/103 |
| 6,089,271 A | 7/2000 | Tani |
| 6,827,105 B1 * | 12/2004 | Marble et al. ................... 137/854 |
| 6,827,492 B2 * | 12/2004 | Cook ............................. 383/103 |
| 7,311,119 B2 * | 12/2007 | Takehana et al. .............. 137/854 |
| 2005/0036718 A1 * | 2/2005 | Wu et al. ........................ 383/103 |
| 2005/0103798 A1 * | 5/2005 | Luigi ................................. 222/3 |
| 2007/0241023 A1 * | 10/2007 | Ootsubo et al. ............. 206/524.8 |
| 2008/0156685 A1 * | 7/2008 | Pham .......................... 206/524.8 |
| 2008/0178884 A1 * | 7/2008 | Gerson et al. ............. 128/206.15 |

FOREIGN PATENT DOCUMENTS

DE 696571 8/1940
DE 102006025814 A1 12/2007

OTHER PUBLICATIONS

International Search Report for PCT/US2010/021452 mailed Apr. 26, 2010.

* cited by examiner

*Primary Examiner* — J. Gregory Pickett
*Assistant Examiner* — Ernesto Grano
(74) *Attorney, Agent, or Firm* — Caesar, Rivise, Bernstein, Cohen & Pokotilow, Ltd.

(57) ABSTRACT

A one-way valve and a flexible package including the valve are disclosed. The valve basically comprises a base member, a flexible septum and a stake. The base member is mounted on a wall of the package and includes a valve seat and at least one inlet port. The septum is formed of a resilient material and is connected to the base member by the stake, with a first portion of the septum contiguous with the stake fixed in position with respect to the base member and a second portion of the septum engaging the valve seat and covering and sealing the at least one inlet port. The septum is arranged to flex off of the valve seat to unseal the at least one inlet port when the pressure of gas at the at least one inlet port reaches a threshold.

29 Claims, 5 Drawing Sheets

ONE-WAY VALVE FOR FLEXIBLE PACKAGE AND PACKAGE INCLUDING A ONE-WAY VALVE

BACKGROUND OF THE INVENTION

This invention relates to valves and more particularly to degassing valves for use in flexible packaging, packages including such valves and methods of making such valves.

Packages made out of flexible material are commonly used to store products to isolate the products from the ambient atmosphere. Those products may be agricultural products, foodstuffs, chemicals, etc. It is a common practice to include in various types of flexible packages a valve to enable air which may be trapped within the bag or gases produced by the contents of the bag to exit the bag through the valve while precluding the ambient atmosphere, e.g., air, from entering into the bag through the valve. Examples of such degassing valves are those sold by Pacific Bag, Inc., of Bellevue, Wash. SIG-Schweizerische Industrie-Besellschaft, of Heuhausen am Rheinfall, Switzerland, also sells such valves (e.g., the valve disclosed in U.S. Pat. No. 4,420,015). Wipf AG Verpackungen, of Volketswil, Switzerland, also sells such valves (e.g., the valve disclosed in U.S. Pat. No. 4,444,219). Luigi Goglio Milano, SPA, of Milan, Italy also sells such valves (e.g., the valve disclosed in U.S. Pat. No. 3,799,427, as well as other valves).

Other examples of one-way valves for packages are also found in the following: U.S. Pat. No. 3,595,467 (Goglio); U.S. Pat. No. 4,576,285 (Goglio); and U.S. Pat. No. 4,705,174 (Goglio).

While the aforementioned valves of the prior art are generally suitable for their intended purposes to vent entrapped gas or air from the flexible package, they still suffer from one or more disadvantages, e.g., complexity, difficulty in assembly, effectiveness in operation.

For example, the valves disclosed in the heretofore identified Goglio patents are somewhat complex in construction, i.e., they comprise three basic components, namely, a valve body, a flexible valve element, and a cap. The valve body includes a least one inlet aperture and a valve seat adjacent the aperture. The cap is a hollow, cup-shaped member which is fixedly secured to the valve body and when so attached forms a hollow interior for the valve. The cap includes an aperture in fluid communication with the interior of the valve to serve as an exit port of vent for the valve. The valve element is a flexible, disk-like member that is disposed within the hollow interior of the valve on the valve seat and normally covers the aperture. The cap member includes a downward projection for engaging a surface of the valve element to ostensibly hold the valve element in place on the valve seat over the aperture. A layer of silicone oil or some other viscous fluid is typically interposed between the valve element and the valve seat to facilitate operation of the valve.

As should be appreciated the Goglio valves require close tolerance parts and precise assembly to ensure effective and repeatable operation. Thus, if there is an inconsistency in the valve's assembly or in the components making up the valve, it may not operate properly. For example, it has been determined that if the projection from the valve cap does not appropriately engage the flexible valve member to hold the it in place on the valve seat, it may fail to reseat itself properly after opening (flexing). Such mis-operation is more prone to occur in applications wherein the valve is subjected to freezing temperatures and changes in ambient pressure, such as could occur if the valve is transported over a mountain range.

The heretofore identified valve sold by Pacific Bag, Inc. while basically comprises a two-piece assembly, is nevertheless a complicated assembly. In particular, it comprises a base portion in the form of a cap-like member having a rubber disk or valve member in it. The cap includes three arcuate gas exit slots which are disposed in a circular array in the center portion of the base member. A circular valve disk, such as made of neoprene or some other rubber, is disposed within the base member and over the three arcuate outlet ports. The valve is designed to flex to enable gas to flow around it and out through the exit ports when the pressure within the package exceeds the ambient pressure. The rubber disk member is held in place by three inwardly extending ears projecting inward from the base or cap member. The mounting arrangement of the disk, i.e., being held in place by the three inwardly extending ears, renders this valve susceptible to the disk popping out of place when gas vents out the valve. Such action thus renders the valve inoperative.

The heretofore identified SIG valve, is a somewhat complex valve that basically comprises a three-piece assembly, that is, a cup-shaped member having a central opening or port, a very thin flexible plastic disk or diaphragm, and an insert or clamping member of generally rectangular shape but having arcuate opposed ends arranged to be snap fit into the cap-shaped member to hold the flexible valve member between it and the outlet port. Gases are enabled to flow through the space between the linear sides of the clamping member and the arcuate portion of the cap under the polyester valve disk or diaphragm and out through the central opening when the pressure within the interior of the flexible package exceeds that of the ambient atmosphere.

The heretofore identified Wipf valve is also of relatively complex construction, e.g., it basically comprises a three-piece member, that is, a cup-shaped valve body having a plural holes or ports, a very thin flexible plastic disk or diaphragm, and an insert or keeper of generally I-shape fit in the cap-shaped member to hold the flexible diaphragm between it and the ports. Gases are enabled to flow through the space between the sides of keeper and the arcuate portion of the cap under the diaphragm and out through the plural ports when the pressure within the interior of the flexible package exceeds that of the ambient atmosphere.

Thus, a need presently exists for a valve which is simple in construction, can be made easily and inexpensively, and operates effectively and repeatedly under various conditions of service.

SUMMARY OF THE INVENTION

One aspect of this invention entails a one-way valve for use on package having an interior for holding a material therein. The package has at least one wall panel bounding an interior in which the material is located. The valve comprises a base member and a flexible septum. The base member comprising a generally hollow interior space, a peripheral side wall bounding the interior space, a valve seat, at least one inlet port located within the bounds of the side wall and in communication with the interior space and a stake projecting into the interior space. The septum is formed of a resilient material having a predetermined shape including a mounting aperture therein and is disposed with respect to the base member so that the stake extends through the aperture, whereupon a first portion of the septum contiguous with the mounting aperture is fixed in position with respect to the base and a second portion of the septum engages the valve seat and covers and seals the at least one inlet port. The septum is arranged so that the second portion of the septum is able to flex when the pressure of gas at the at least one inlet port reaches a predetermined threshold to cause the second portion of the septum to move away from the valve seat and open the at least one inlet port. The second portion of the septum is also arranged to automatically flex back onto the valve seat to seal the at least one inlet port when the pressure of gas at the at least one inlet port drops below the predetermined threshold.

Another aspect of this invention is a flexible package including a one-way valve constructed in accordance with the first aspect of this invention.

Another aspect of this invention is a method of assembling a one-way valve for use on package having an interior for holding a material therein. The method basically entails providing a base member comprising a generally hollow interior space, a peripheral side wall bounding the interior space, a valve seat, at least one inlet port located within the bounds of the side wall and in communication with the interior space, and a stake projecting into said interior space. The method additionally entails providing a septum formed of a resilient material having a predetermined shape including a mounting aperture and extending the stake through the mounting aperture in the septum to hold a first portion of the septum contiguous with the mounting aperture in place with respect to the base and with a second portion of the septum engaging the valve seat and covering and sealing the at least one inlet port. The septum is arranged so that the second portion of it is able to flex when the pressure of gas at the at least one inlet port reaches a predetermined threshold to cause the second portion of the septum to move away from the valve seat and open the at least one inlet port. The second portion of said septum is also arranged to automatically flex back onto the valve seat to seal the at least one inlet port when the pressure of gas at the at least one inlet port drops below the predetermined threshold.

DETAILED DESCRIPTION OF THE PREFERRED EMBODIMENT

Figure 1:
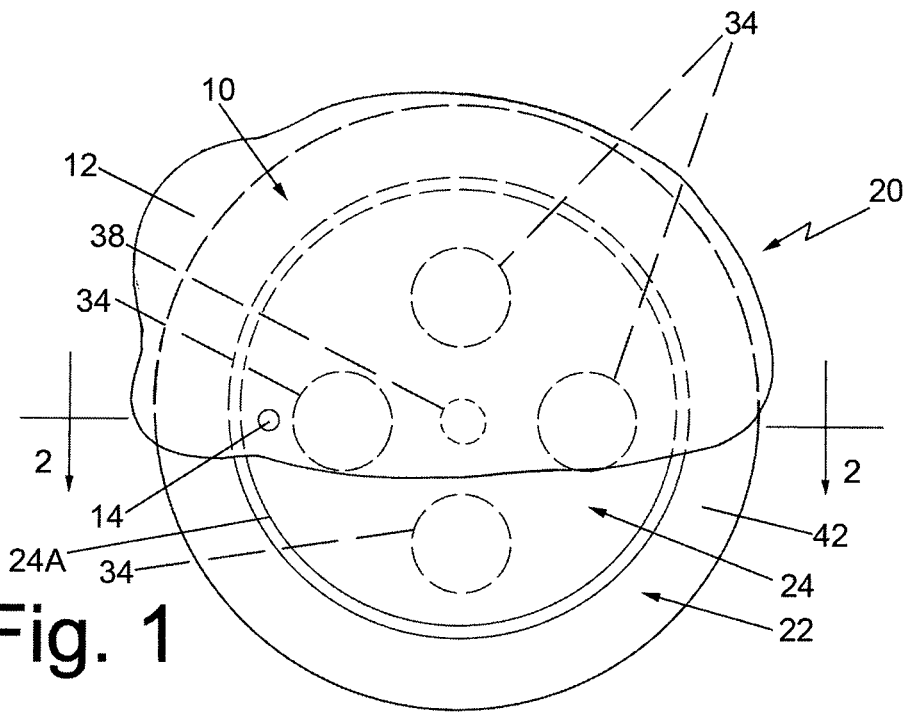
FIG. 1 is a top plan view of one exemplary valve constructed in accordance with this invention shown mounted on the inner wall of an exemplary flexible package.

Referring now to the various figures of the drawing wherein like reference characters refer to like parts, there is shown at 20 in FIG. 1 one exemplary embodiment of a one-way valve constructed in accordance with this invention. It should be pointed out at this juncture that this invention contemplates a variety of embodiments of that valve, all of which are particularly suitable for use with a flexible package 10 to enable gases to vent out of the package when the pressure within the package reaches a predetermined threshold. In the embodiment shown in FIG. 1, only a portion of the wall 12 of the exemplary package 10 is shown. One preferred application for the subject valves is for flexible packaging designed to hold roasted coffee, either whole bean or ground, since such products typically de-gas. For such applications, the package 10 is formed of a web of flexible material having one or multiple layers to prevent the ingress of oxygen into the package, while also preventing coffee flavor components from escaping the package. To that end, as is a common practice, the package on which the subject valve is mounted, may be formed of a variety of high barrier plastics and/or foil materials as required by the weight of coffee and its method of distribution. While the valves of this invention are described in the context of use on packages for coffee, it should be clear the subject invention should not be deemed to be limited to any specific types of flexible packages or the material forming them.

Figure 2:
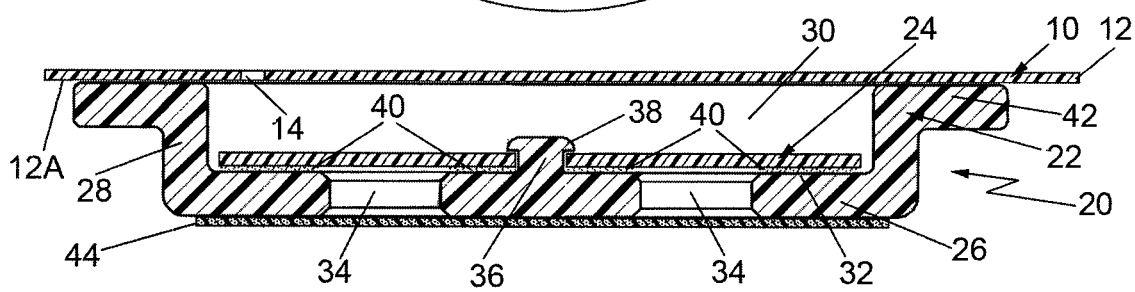
FIG. 2 is a slightly enlarged sectional view taken along line 2-2 of FIG. 1.
Figure 3:
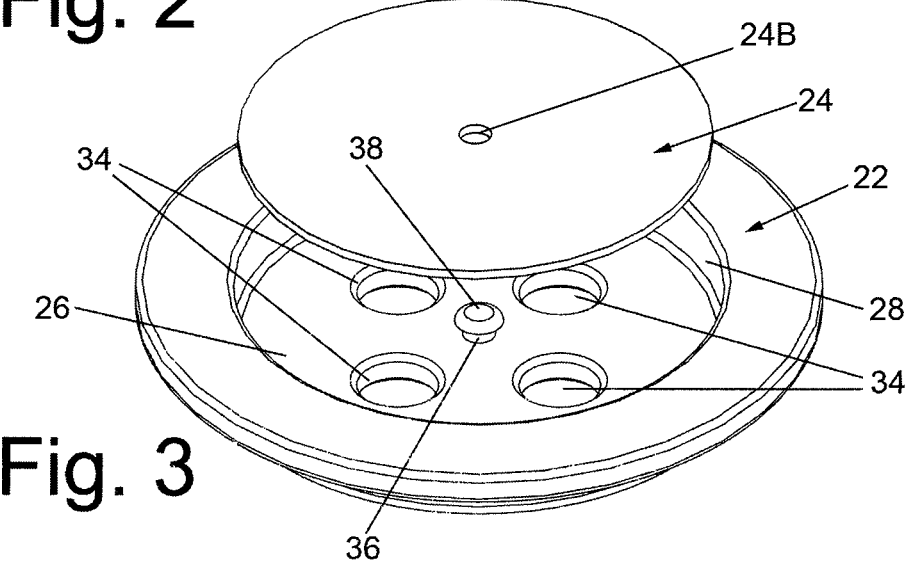
FIG. 3 is an exploded isometric view showing the two basic components of the valve shown in FIGS. 1 and 2, namely, the base member and the septum.

The valve 20 is arranged to be mounted on the inner surface 12A (FIG. 2) of any portion of the wall 12 making up the package. The valve 20 is very simple in construction, and is easy to fabricate and assemble. Thus, as can be seen in FIGS. 1 and 2 the valve 20 comprises two basic components, namely, a hollow body or base member 22 and a flexible valve diaphragm or septum 24. The hollow body 22 is formed, e.g., injection molded as an integral unit, of any suitable, somewhat rigid material, e.g., polyethylene. The septum 24 is a generally planar, disk-like member formed of a resilient, flexible material. For example, the septum 24 may be stamped from a sheet of polyisobutylene rubber. The hollow body 22 includes a generally planar base wall 26 having a peripheral sidewall 28 projecting upward therefrom. The free edge portion of the sidewall 28 (to be described later) serves to mount the valve 20 onto the interior surface 12A of the wall 12 of the package 10. The sidewall 28, the base wall 26 and the portion of the wall 12 of the package 10 within the confines of the sidewall 28 define a hollow interior space 30 (FIG. 2) within the valve. The valve 20 is arranged so that gases may enter into its hollow interior when the pressure within the package 10 reaches the operating pressure of the valve, e.g., Target 0.05 psi, and then pass out the valve through an outlet port or vent 14. The outlet port basically comprises an aperture in the wall 12 of the package 10 within the confines of the valve's sidewall 28. The aperture 14 may be asymmetrically located adjacent one portion of the sidewall 28 or may be centrally located. Locating the aperture closer to the sidewall has the advantage of facilitating the aperture's formation, i.e., it is easier to pierce through the wall of the package to form the aperture if the aperture is located closer to a portion of the sidewall of the valve than if it is centrally located since the wall of the package may tend to give more in the center of the valve. The wall 12 may include plural apertures 14 within the confines of the valve to provide plural outlets for the valve.

The base wall 26 of the valve can be of any shape. In the exemplary embodiments of the valve shown herein the base wall is circular. The top surface of the base wall 26 adjacent the sidewall 26 is planar and forms the seat 32 of the valve 20. A plurality of chamfered apertures 34 extend through the base wall and are in fluid communication with the hollow interior 30 of the valve. The apertures 34 together form the inlet to the valve 20 through which gasses from the interior of the package 10 can flow to vent out the outlet 14 (as will be described later). In the embodiment shown there are four apertures 34, each of circular shape, and which are equidistantly spaced from one another. The number, size, shape and disposition of the apertures 34 can be selected depending upon the operating characteristics desired for the valve. In fact, this invention even contemplates use of only a single aperture 34 to serve as the inlet port of the valve. Irrespective of the number, size and shape of the apertures used, they should be located spaced inward of the valve seat 32, so that the valve seat encircles the inlet port(s).

A projection or stake 36 projects upward from the center of the top surface base wall 26 so that it extends somewhat into the hollow interior 30 of the valve. The stake 36 serves to hold the center portion of the septum 24 in place with respect to the base wall 26. The septum 24 is preferably of a similar size and shape to the base wall 26, so that the peripheral edge 24A of the septum is located closely adjacent the inner surface of the sidewall 28 and thus covers the valve seat 32.

The mounting of the septum 24 to the base member 22 can be accomplished in various ways. For example, the septum 24 may be provided with a central opening 24B which is slightly smaller in cross-section than the cross sectional area of the stake 36, so that the portions of the septum contiguous with the opening 24B can be stretched slightly to receive the stake 36, whereupon the septum 24 can be positioned so that it is in intimate engagement with the top surface of the base wall, such as shown in FIG. 2. In order to ensure that the septum remains fixed in that position, e.g., so that it doesn't slide upward on the stake, the free end of the stake is in the form of a slightly bulbous head 38. The use of a slightly bulbous head on the stake is particularly useful if the opening in the septum is the same size or slightly larger than the cross-sectional area of the stake.

As can be seen, a layer of a conventional, a viscous fluid, e.g., silicone oil 40, is provided in the valve 20 at the interface of the septum 24 and the top surface of the base wall 26 to facilitate operation of the valve. The silicone oil is sufficiently viscous that it doesn't migrate and exit through the apertures 34.

In order to mount the valve onto the inner surface of the package 10, the valve includes a mounting flange. In particular, the free edge of the sidewall 28 is in the form of an annular flange 42. The flange 42 is arranged to be fixedly secured, e.g., heat bonded, to the inner surface 12A of the wall 12 of the package 10 to mount the valve in the package.

The embodiments of the valves shown herein are particularly suitable for use in flexible package for ground or whole bean coffee, which as is well known tends to de-gas over time. For such applications, the valve may include a filter to preclude any particulate material inside the package 10 from gaining ingress into the valve, where it could disrupt proper operation of the valve. To that end, as shown in FIG. 2 a disk 44 of filter material, e.g., a circular sheet of non-woven, heat-sealable filter paper, is fixedly secured to the outside surface of the valve's base wall 26. As should be appreciated by those skilled in the art, the inlet apertures 34 can be made of sufficient size and number to form a filter preventing the ingress of particulate material into the valve. In such a case, the use of the filter disk 44 can be eliminated.

The septum 24, as mentioned above, is a resilient flexible material and in the exemplary embodiments shown and described herein is very thin, e.g., in the range of 1.5 mm to 0.020 mm. As such, the portion of the septum located remote from its central portion, i.e., its peripheral portion overlying the valve seat, is able flex upward under pressure of gas entering into the valve's interior via the valve's inlet ports 34, as shown by the arrows in FIG. 4. Thus, gas within the package, e.g., gas produced by the degassing coffee, is enabled to flow through the inlet ports 34, into the hollow interior 30 of the valve and out through the at least one opening or vent 14 to the ambient atmosphere. In particular, when the pressure within the package reaches a threshold value the peripheral portion 24A of the septum flexes upward off the valve seat breaking the adhesive effect of the interposed silicone oil 40 and uncovering the inlet ports.

The elastic nature of the septum 24 also serves to effect the automatic reclosure of the valve 20 when the pressure within the package 10 drops below the threshold, whereupon the septum assumes its unflexed, flat configuration in engagement with the valve seat, as shown in FIG. 2. In order to ensure that the septum engages the valve seat and closes the inlet apertures 34 when the pressure within the package is below the desired operating threshold of the valve, the septum has a modulus of elasticity within the range of 550 Kpsi to 0.2 Kpsi. As will be appreciated by those skilled in the art, the viscous nature of the silicone oil at the interface of the septum 24 and the portion of the base wall 26 within the valve seat creates a seal between the septum and the valve seat which is impermeable to atmospheric gases, e.g., oxygen, moisture and odors.

The filter disk 44 is disposed on the base member of the valve so that it covers the inlet apertures in the base member in order to protect the septum 24 and contiguous valve seat from being contaminated or otherwise rendered inoperative by the ingress particles of any particulate material held within the package 10.

Figure 4:
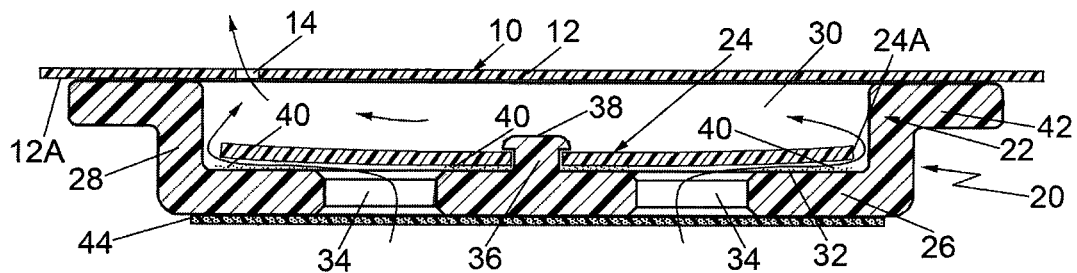
FIG. 4 is a sectional view, similar to that of FIG. 2, but showing the operation of the valve to vent gas from the interior of the package to the ambient atmosphere.
Figure 5:
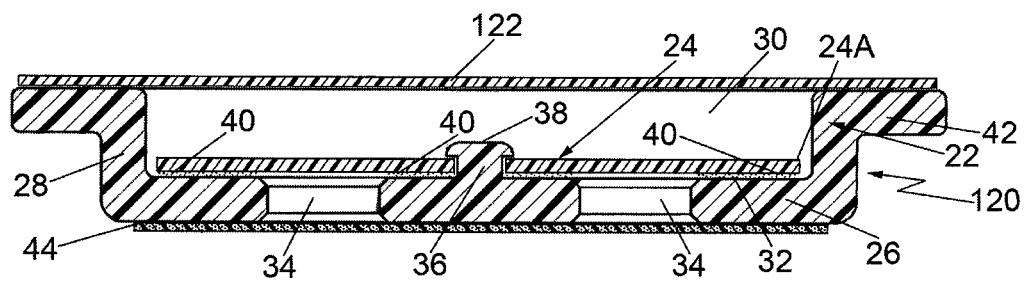
FIG. 5 is a sectional view, similar to FIG. 2, showing an alternative embodiment of a valve constructed in accordance with this invention prior to being mounted on a flexible package.

In FIG. 5 there is shown an alternative embodiment 120 of a one-way valve constructed in accordance with this invention. The valve 120 is similar to the valve 20 as described above except that it includes a cover to prevent dust, dirt or other debris from getting into the interior of the valve before the valve is secured to the inner surface of the package 10. In FIG. 5 the valve is shown in its condition before it is mounted onto the inner surface of a package 10. In the interest of brevity all of the details of the construction and operation of the valve 120 will not be reiterated herein and those features/ components of valve 120 that are common to valve 20 will be given the same reference numbers. Thus, as can be seen in FIG. 4, the valve 120 includes a cover 122 formed of a flexible sheet of any suitable material, which is secured to the flange 42 of the valve's side wall 28, thereby isolating the interior space 30 from the ambient surroundings. Mounting of the valve 120 onto the inner surface of a portion of the wall of a package is accomplished without removing the cover, i.e., the cover 122 will be interposed between the flange 42 and the inner surface 12A of the wall 12 of the package 10. The aperture or outlet 14 for the valve is produced by puncturing through the wall 12 of the package and the underlying cover 122 within the confines of the periphery of the valve's flange 42.

Figure 6:
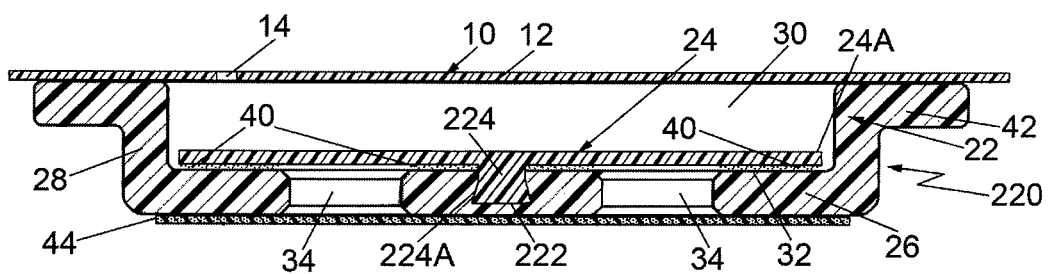
FIG. 6 is a sectional view, similar to FIG. 2, showing another alternative embodiment of a valve constructed in accordance with this invention mounted on the inner wall of an exemplary flexible package.

In FIG. 6 there is shown another exemplary embodiment of a valve 220 constructed in accordance with this invention. The valve 220 is similar to the valve 20 as described above except that the stake which holds the septum in place on the valve seat forms a portion of the septum itself and not a portion of the base member of the valve. In the interest of brevity all of the details of the construction and operation of the valve 220 will not be reiterated herein and those features/components of valve 220 that are common to valve 20 will be given the same reference numbers. To that end, as can be seen the base wall 26 of the valve includes a socket 222 at its center. The septum 24 includes projection 224 extending downward from its undersurface at the center of the septum. The projection forms the stake for the valve and its free end 224A is shaped to mate with the shape of the socket 222. In the embodiment shown the free end of the stake 224 is flared to fit within a correspondingly shaped undercut socket. According, when the free end of the stake 224 is within the socket 222 the central portion of the septum 24 will be fixedly secured to the center of the base wall 26, with the peripheral portions 24A of the septum 24 free to flex upward off of the valve seat, like described above. The septum 24 with its integral stake 224 can be preformed, e.g., punched out of a sheet of appropriately shaped material, and then assembled to the valve's base wall, or can be formed in place, e.g., injection molded in situ, on the base wall. The silicone oil 40, if used in the valve (as is preferable, but not mandatory), can be applied during the valve formation/assembly process by directly injecting it onto the base wall 26 or using some other applicator device, e.g., a pad printer.

Figure 7:
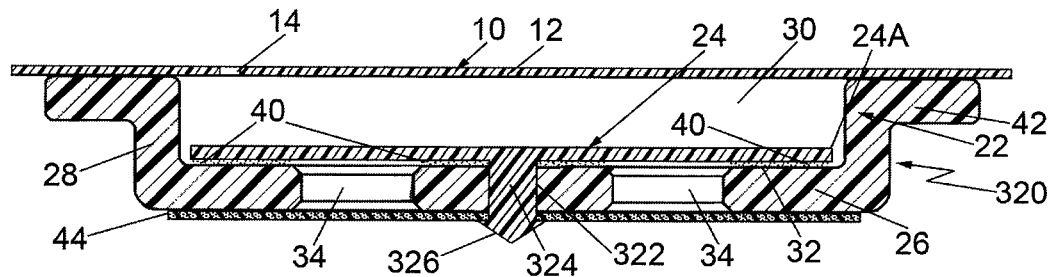
FIG. 7 is a sectional view, similar to FIG. 2, showing another alternative embodiment of a valve constructed in accordance with this invention mounted on the inner wall of an exemplary flexible package.

In FIG. 7 there is shown another exemplary embodiment of a valve 320 constructed in accordance with this invention. The valve 320 is similar to the valve 220. In the interest of brevity all of the details of the construction and operation of the valve 320 will not be reiterated herein and those features/components of valve 320 that are common to valves 220 and 20 will be given the same reference numbers. To that end, as can be seen the base wall 26 of the valve includes an aperture 322 at its center. The septum 24 includes projection 324 extending downward from its undersurface at the center of the septum. The projection forms the stake for the valve. Its free end is in the form of an enlarged head 326 whose outer surface is of conical shape. The size of the head 326 is arranged to compress slightly so that it can pass through the aperture 322 to snap fit the stake to the base wall 26. According, when the head 326 of the stake 324 has passed through the aperture 322, the central portion of the septum 24 will be fixedly secured to the center of the base wall 26, with the peripheral portions 24A of the septum 24 free to flex upward off of the valve seat, like described above.

Figure 8:
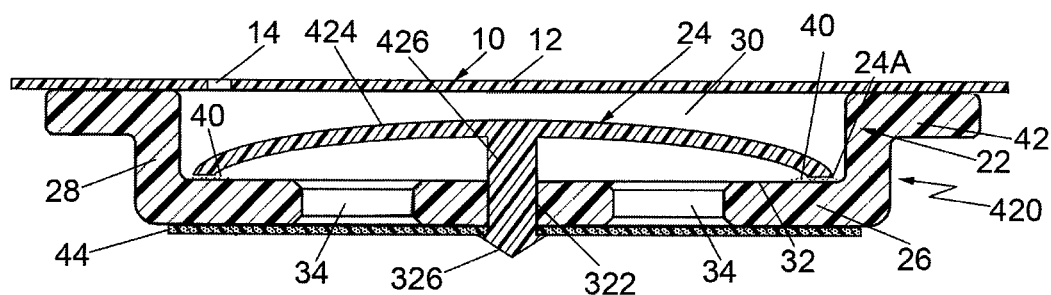
FIG. 8 is a sectional view, similar to FIG. 2, showing another alternative embodiment of a valve constructed in accordance with this invention mounted on the inner wall of an exemplary flexible package.

In FIG. 8 there is shown another exemplary embodiment of a valve 420 constructed in accordance with this invention. The valve 420 is similar to the valve 320 except that the septum is of a different shape and is preloaded so that portions of it are more strongly biased into engagement with the valve seat. In the interest of brevity all of the details of the construction and operation of the valve 420 will not be reiterated herein and those features/components of valve 420 that are common to valves 320, 220 and 20 will be given the same reference numbers. To that end, as can be seen the septum 24 includes a convex or slightly domed shaped portion 424, with a stake 426 projecting downward from the center of the undersurface of the septum so that its head 326 extends through the aperture 322 in the base wall. The peripheral edge of the dome shaped portion of the septum 24 is coplanar and engages the valve seat 32, with the silicone oil 40 interposed therebetween. As should be appreciated by those skilled in the art the length of the stake 426, the thickness of the dome shaped portion 424, the amount of its curvature and the modulus of elasticity of the septum can all be selected to provide the appropriate operating pressure at which the peripheral edge of the septum will lift off of the valve seat to open the inlet ports 34, e.g., to provide a valve with a higher operating pressure than the embodiment of FIG. 2.

Figure 9:
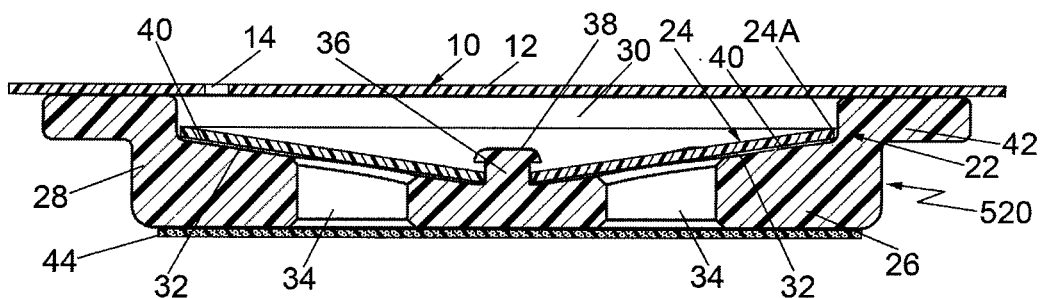
FIG. 9 is a sectional view, similar to FIG. 2, showing another alternative embodiment of a valve constructed in accordance with this invention mounted on the inner wall of an exemplary flexible package.

In FIG. 9 there is shown another exemplary embodiment of a valve 520 constructed in accordance with this invention. The valve 520 is similar to the valve 420 in that the septum is preloaded to provide a higher operating pressure than the valve 20 of FIGS. 2-7. In the interest of brevity all of the details of the construction and operation of the valve 520 will not be reiterated herein and those features/components of valve 520 that are common to valves 420, 320, 220 and 20 will be given the same reference numbers. Unlike the embodiment of the valve 420, the septum 24 of the valve 520 is a generally planar member, like those of FIG. 2, but the base wall of the valve is of concave shape to effectively preload the septum 24 so that peripheral portions of the septum are more strongly biased into engagement with the valve seat 32 than the valve of FIG. 2. In the interest of brevity all of the details of the construction and operation of the valve 520 will not be reiterated herein and those features/components of valve 520 that are common to valves 420, 320, 220 and 20 will be given the same reference numbers. To that end, as can be seen the top surface of the base wall 26 of the valve is of a concave, e.g., conical, shape, with the stake 36 projecting upward from the nadir at the center of that surface. The septum 24 is constructed similarly to the septum 24 of the embodiment of the valve 20 shown in FIG. 2. The stake 36 extends through the aperture 24B in the center of the septum to fixedly secure the center of the septum with respect to base wall 26, i.e., with the portion of the septum contiguous with the aperture 24B in engagement with the underlying conical surface of the base wall. Since the septum is a normally flat resilient member, the portion of the septum extending radially outward from its center are flexed upward by the conical surface of the base wall 26, thereby effectively preloading the septum. In this regard, the resiliency of the septum tends to bias it to attempt to assume its normally planar condition, but the conical surface prevents such action, thereby loading the septum. The peripheral edge portions of the loaded septum engage the valve seat 32, with the silicone oil 40 interposed therebetween, thereby effectively sealing the inlet apertures 34. When the pressure within the package reaches the threshold at which the preloaded septum will begin to flex off of the valve seat those apertures will be uncovered so that the gases within the package can vent out of the valve as described above.

The angle of the conical surface of the base wall 26 can be chosen to provide any desired degree of preloading for the septum. Thus, it is contemplated that the angle can be from slightly more than 0 degrees to 45 degrees or even greater for various valve operating pressures. As should be appreciated by those skilled in the art, the amount of preloading is also dependent upon the thickness of the septum and the modulus of elasticity of the material making up the septum.

Figure 10:
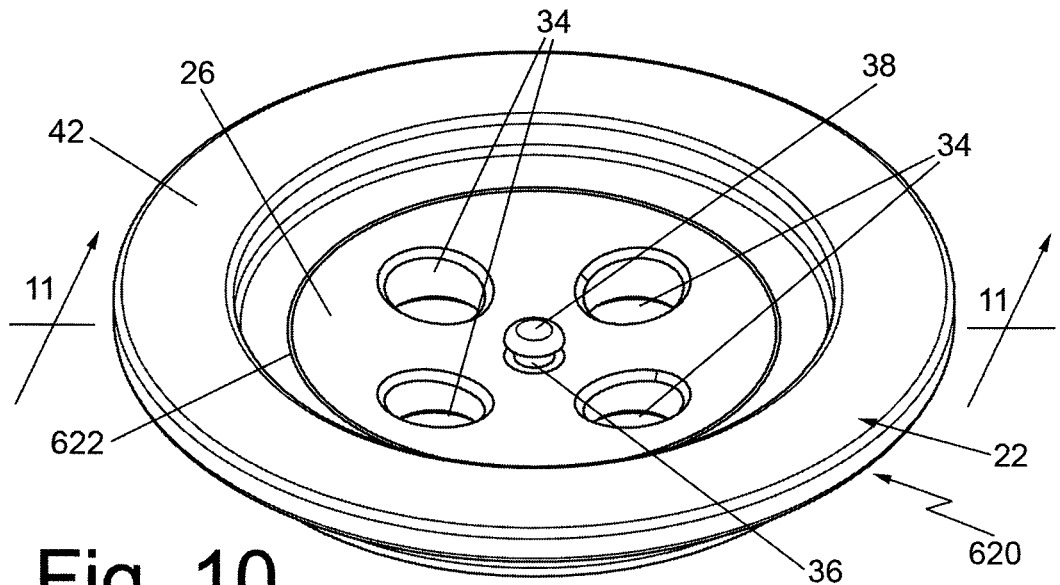
FIG. 10 is an isometric view of the base member of another alternative valve constructed in accordance with this invention.
Figure 11:
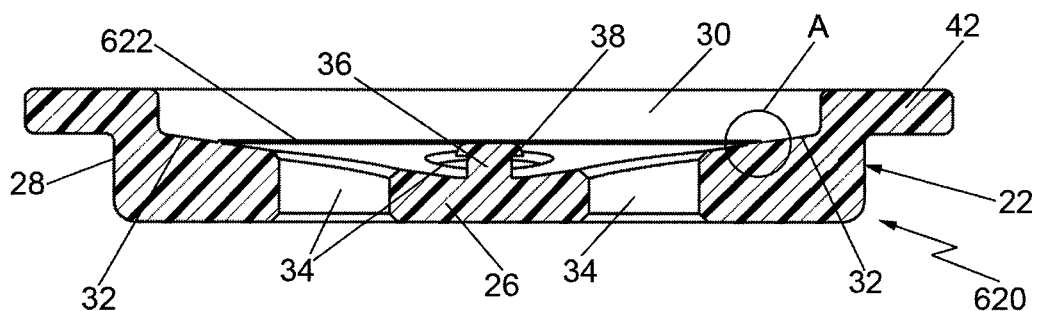
FIG. 11 is a slightly enlarged sectional view taken along line 11-11 of FIG. 10.
Figure 12:
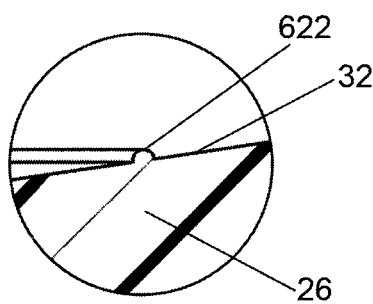
FIG. 12 is a greatly enlarged view of the portion of the valve shown within the circle A in FIG. 11.

In FIGS. 10-12 there is shown another exemplary embodiment of a valve 620 constructed in accordance with this invention. The valve 620 is similar to the valve 520 except that it includes a feature to ensure that the silicone oil 40 doesn't migrate from between the valve seat and the septum. In the interest of brevity all of the details of the construction and operation of the valve 620 will not be reiterated herein and those features/components of valve 620 that are common to valves 520, 420, 320, 220 and 20 will be given the same reference numbers. Thus, as can be seen best in FIG. 12 an annular ridge 622 projects upward from the upper conical surface of the base wall 26. The ridge 622 is circular in shape when viewed from above and is located radially inward from the valve seat 32. The ridge 622 has a small radius of curvature, e.g., 0.05 mm measured in a transverse plane, e.g., the plane of FIG. 12. Thus, while the top edge of the ridge extends only a slight distance above the valve seat surface 32 it is arranged to engage the undersurface of septum 24 to trap the silicone oil on the valve seat between it and the peripheral portion of the septum. This action serves to prevent migration of the oil from its desired position in the valve.

Figure 13:
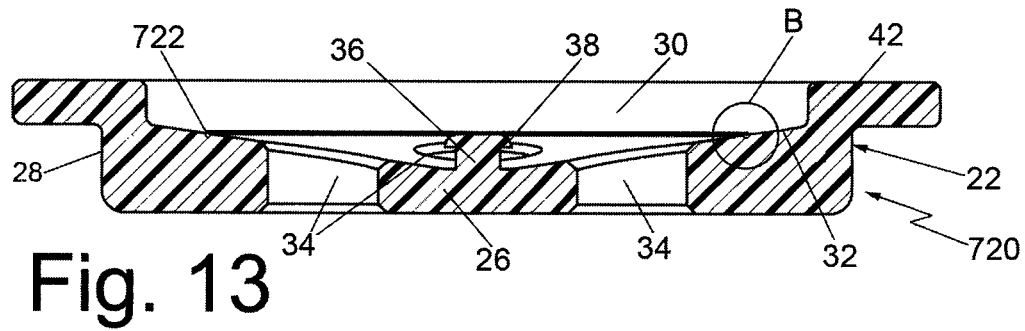
FIG. 13 is a sectional view, similar to FIG. 11, showing the base member of another alternative embodiment of a valve constructed in accordance with this invention.
Figure 14:
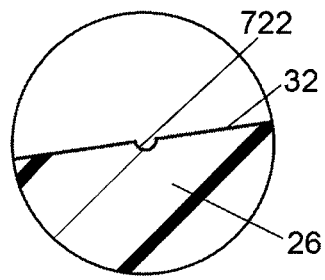
FIG. 14 is a greatly enlarged view of the portion of the valve shown within the circle B in FIG. 13.

In FIGS. 13 and 14 there is shown another exemplary embodiment of a valve 720 constructed in accordance with this invention. The valve 720 is similar to the valve 620 in that it includes a feature to ensure that the silicone oil 40 doesn't migrate from between the valve seat and the septum. In addition the valve 720 is of more compact design, i.e., the side wall 28 is shorter in height, than the valve 620. In the interest of brevity all of the details of the construction and operation of the valve 720 will not be reiterated herein and those features/components of valve 720 that are common to valves 620, 520, 420, 320, 220 and 20 will be given the same reference numbers. Thus, as can be seen best in FIG. 14 an annular recess 722 is located in the upper conical surface of the base wall 26. The recess 722 is circular in shape when viewed from above and is located radially inward from the valve seat 32. The recess 722 has of a small radius of curvature, e.g., 0.05 mm measured in a transverse plane, e.g., the plane of FIG. 14. The recess 722 is arranged to trap the silicone oil on the valve seat between it and the peripheral portion of the septum to thereby prevent migration of the oil from its desired position.

Figure 15:
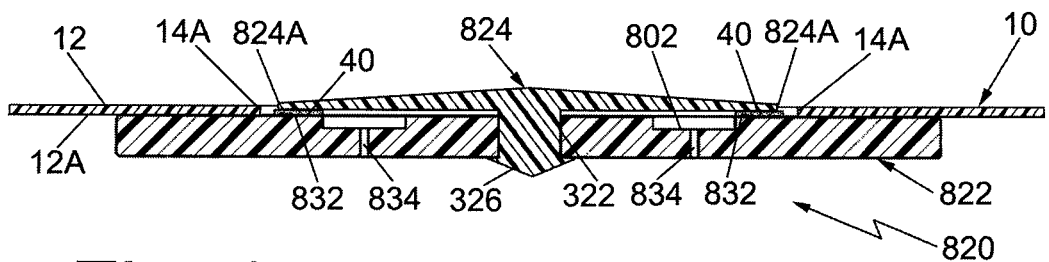
FIG. 15 is a sectional view, similar to FIG. 7, but showing another alternative embodiment of a valve constructed in accordance with this invention.
Figure 16:
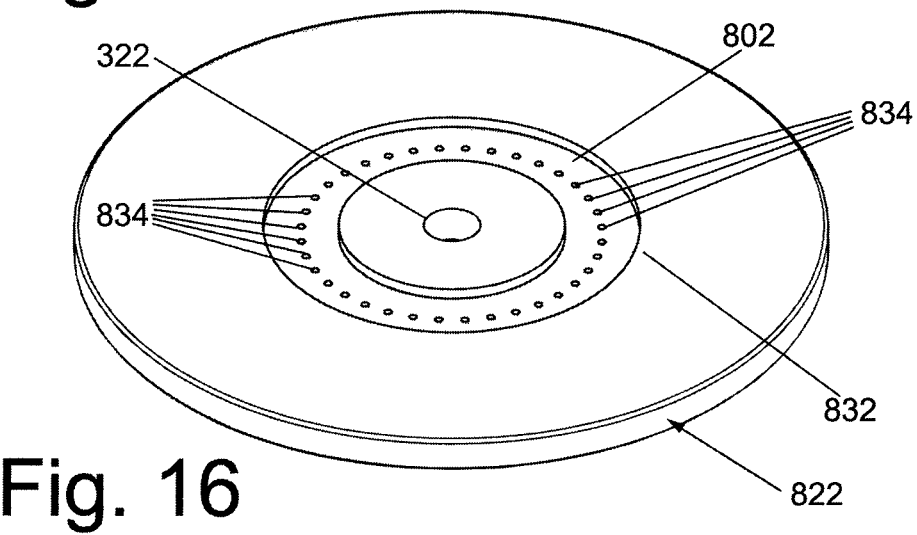
FIG. 16 is a slightly reduced isometric view of the base member of the embodiment of the valve shown in FIG. 15.

In FIG. 15 there is shown another exemplary embodiment of a valve 820 constructed in accordance with this invention. The valve 820 is of a simpler construction and more compact size than the valves described heretofore, yet is somewhat similar to the valve 320 in that it makes use of a septum 824 that includes an integral stake. In the interest of brevity the details of the construction and operation of the valve 820 will not be reiterated herein and those features/components of valve 820 that are common to valve 320 will be given the same reference numbers. To that end, the valve 820 utilizes a simple flat plate valve body, i.e., its base member 822 is a planar, disk-like member of circular profile. The body 822 has an annular recess 802 in its top surface. The portion of the top surface outside the periphery of the recess 802 forms the valve seat 832 of the valve. A large plurality of equidistantly spaced apertures 834 extend through the base member 822 from its bottom surface to the annular recess 802. The apertures 834 form the inlet to the valve. The base member 822 includes a hole or opening 322 at its center to which the septum is secured.

The septum 824 includes a top portion of circular profile whose upper surface is of slightly conical shape and whose undersurface is planar. Like the septum 24 of FIG. 7, the septum 824 includes a projection 324 extending downward from the center of its undersurface. The projection forms the stake for the valve 820. The free end of the stake 324 is in the form of an enlarged head 326 whose outer surface is of conical shape. The size of the head 326 is arranged to compress slightly so that it can pass through the opening 322 in the base member 822 to snap fit the stake to the base member. Accordingly, when the head 326 of the stake 324 has passed through the opening 322, the central portion of the septum 824 will be fixedly secured to the center of the base member 822. Moreover, the top portion of the septum is of a sufficient diameter so that its peripheral portions 824A overlie the valve seat 824. The septum 824 is formed of a flexible material, like that described above, so that the portion of the septum contiguous with its peripheral edge 824A is free to flex upward off of the valve seat 832, like described above, when the pressure within the package 10 on which the valve is mounted reaches the valve's operating pressure.

The valve 820 is mounted at a hole 14A that is punched in the wall 12 of the package 10 at any desired location for the valve. The hole 14A forms the vent for the valve 820. The valve 820 is mounted on the package 10 at the hole 14A by affixing, e.g., heat bonding or welding, the portion of its upper surface outside the valve seat 832 to the inner surface 12A of the wall 12 of the package contiguous with the hole 14A. The hole 14A is of a larger diameter than the diameter of the septum 824 to create an annular passageway between its periphery and the periphery 824A of the septum 824 through which gasses from within the package 10 can vent when the operating pressure of the valve is reached. Like the other embodiments of the valves of this invention, a thin layer of silicone oil 40 is interposed between the undersurface of the septum 824 adjacent its periphery and the underlying valve seat 832.

As should be appreciated by those skilled in the art the annular recess 802 of the valve 820 forms an open zone, wherein the pressure of gas at the inlet ports 834 (i.e., the pressure of gas within the package 10) can act on a larger surface area of the septum, thereby increasing the lifting force against the septum to result in a lower operating pressure for the valve.

While the valve 820 is shown as having a septum with an integral stake, that arrangement is merely exemplary. Thus, the valve base member 822 can include the stake, with the septum being constructed similar to that of the valve 20 (e.g., a septum having a hole in it). Inasmuch as the valve 820 includes a large number of small diameter inlet apertures, the valve need not include a filter element 44, but such an element can be used if desired. Moreover, while the embodiments of the valves shown heretofore have all included use of silicone oil at the interface of the valve seat and the septum, it is contemplated that for some applications the use of silicone oil may be obviated, e.g., for applications wherein the valve's septum is preloaded.

As mentioned above the valves of this invention can be of any suitable size and shape, depending upon the application to which they are to be put. The following represents an exemplary set of dimensions for valve that have particular utility for use in flexible packaging for coffee. To that end, the valves shown in FIGS. 1-8 each have a thickness of 3 mm, with the thickness of each valve's flange being 1.0 mm. The diameter of each valve's flange is 21 mm and with the outside diameter of the valve's side wall being 17 mm. The inside diameter of each valve's hollow interior is 15 mm, with a depth of 2 mm, and with each of the inlet apertures having an inside diameter of 2.5 mm. The filter disk of each of the valves of FIGS. 1-8 has a diameter of 15 mm and a thickness of 0.3 mm. The stake of each of the valves of FIGS. 1-6 is 1 mm in diameter, with its head being 1.5 mm in diameter. The septum of each of the valves of FIGS. 1-5 has an outside diameter of 14.6 mm, with its central hole or aperture being of 1 mm diameter and with its thickness being 0.3 mm. The septum of the valve of FIG. 6 also has an outside diameter of 14.6 mm and a thickness of 0.3 mm, but includes an integral stake having a maximum outside diameter of 2 mm and a minimum outside diameter of 1.5 mm. The septum of the valve of FIG. 7 also has an outside diameter of 14.6 mm and a thickness of 0.3 mm, with its integral stake having an outside diameter of 1 mm and with the head of the stake having an outside diameter of 1.54 mm. The septum of the embodiment of the valve in FIG. 8 also has an outside diameter of 14.5 mm and a thickness of 0.5 mm, and is curved so that the height measured from the plane of its periphery to its apex is 2.5 mm. The valve of FIG. 9 is of the same basic dimensions as the valve of FIG. 1, except that the depth of the interior at the inner surface of its side wall is 1 mm. The valve of FIG. 11 is of the same basic dimensions as the valve of FIG. 9, except that it includes the heretofore identified annular ridge, which has a cross-sectional diameter of 0.1 mm. The valve of FIG. 11 is of the same basic dimensions as the valve of FIG. 9, except that it includes the heretofore identified annular recess, which also has a cross-sectional diameter of 0.1 mm. The valve 820 of FIG. 15 has the same basic dimensions as the valve of FIG. 7, except that the thickness of its base member 822 is significantly less, e.g., it is 1.4 mm. The apertures 834 making up the inlet ports to the valve are each approximately 0.5 mm in diameter. The annular recess is approximately 0.5 mm deep, with an inside diameter of 6 mm and an outside diameter of 9 mm. The outside diameter of the septum is 13 mm, with the thickness of the septum adjacent its peripheral edge being approximately 0.5 mm.

As should be appreciated from the foregoing the valves of the subject invention provide the advantages of prior art valves and overcome some of their disadvantages, yet are very simple construction and easy and inexpensive to manufacture.

Without further elaboration the foregoing will so fully illustrate our invention that others may, by applying current or future knowledge, adopt the same for use under various conditions of service.

We claim:

1. A one-way valve for use on package having an interior for holding a material therein, the package having at least one wall panel bounding an interior in which the material is located, said valve comprising a base member, a cover member, a septum, a viscous fluid and a stake, said base member comprising a side wall and a valve seat, said side wall having an end surface, said cover member comprising a puncturable film secured to said end surface and forming an interior space which is isolated from the ambient surroundings and in which said valve seat and said septum are located, said valve being arranged to be secured to the at least one wall panel of the package with said cover member interposed therebetween, the wall of the package being arranged to be punctured, whereupon said cover member is punctured to form an outlet for said valve, said valve seat having a planar surface and at least one inlet port in fluid communication with said planar surface, said septum having an unflexed state in which said septum is a planar member having first planar central portion and a second planar portion surrounding said first planar central portion, said septum being formed of a flexible material, said stake projecting upward from said planar surface of said valve seat within said internal space and connecting said first planar central portion of said septum to said base member whereupon said first planar central portion of said septum contiguous with said stake is fixed in position with respect to said base member and said second planar portion of said septum engages said planar valve seat with said viscous fluid interposed between said second planar portion of said septum and said valve seat and covers and seals said at least one inlet port, said viscous fluid forming a releasably securable bond holding said septum in engagement with said valve seat, said septum being arranged so that said second planar portion of said septum is able to flex when the pressure of gas at said at least one inlet port reaches a threshold to overcome said releasably securable bond to cause said second portion of said septum to move away from said valve seat and open said at least one inlet port to allow the gas to enter into said interior of said valve and exit through the outlet, said second portion of said septum being arranged to automatically flex back onto said valve seat with said viscous fluid interposed therebetween to seal said at least one inlet port when the pressure of gas at said at least one inlet port drops below said threshold.

2. The one-way valve of claim 1 wherein said stake forms a portion of said base member and said septum includes a mounting aperture, said stake extending through said mounting aperture.

3. The one-way valve of claim 2 wherein said septum is held on said stake by secure frictional engagement between said first portion of said septum contiguous with said mounting aperture and a portion of said stake.

4. The one-way valve of claim 2 wherein said first portion of said septum is stretchable to enable said stake to be inserted therethrough.

5. The one-way valve of claim 1 additionally comprising a filter sheet located contiguous with said base member and extending over said at least one inlet port.

6. The one-way valve of claim 1 wherein said septum is formed of a thermoplastic vulcanizate.

7. The one-way valve of claim 6 wherein said stake forms a portion of said base member and said septum includes a mounting aperture, and wherein said stake projects into said interior space and extends through said mounting aperture.

8. The one-way valve of claim 7 wherein said base member is molded as an integral unit.

9. The one-way valve of claim 1 wherein said base member comprises a generally concave, conical surface forming said valve seat and wherein said at least one inlet port is located in said concave, conical surface.

10. The one way valve of claim 9 additionally comprising a viscous fluid located at an interface of said valve seat and said septum and an annular ridge on said base member for holding said viscous fluid on said valve seat.

11. The one way valve of claim 9 additionally comprising a viscous fluid located at an interface of said valve seat and said septum and an annular groove on said base member for holding said viscous fluid on said valve seat.

12. The one-way valve of claim 1 wherein said stake forms a portion of said septum and wherein said base includes an opening into which a portion of said stake extends.

13. The one-way valve of claim 12 wherein said septum is of a convex shape.

14. The one-way valve of claim 1 wherein said septum has a modulus of elasticity of at least 0.2 Kpsi.

15. A package having an interior for holding a material therein, said package comprising at least one wall panel bounding an interior in which the material is located and a one-way valve, said one-way valve comprising a base member, a cover member, a septum, a viscous fluid and a stake, said base member comprising a side wall and a valve seat, said side wall having an end surface, said cover member comprising a puncturable film secured to said end surface and forming an interior space which is isolated from the ambient surroundings and in which said valve seat and said septum are located, said valve being arranged to be secured to said at least one wall panel of the package with said cover member interposed therebetween, said wall of said package being arranged to be punctured, whereupon said cover member is punctured to form an outlet for said valve, said valve seat having a planar surface and at least one inlet port in fluid communication with said planar surface, said septum having an unflexed state in which said septum is a planar member having first planar central portion and a second planar portion surrounding said first planar central portion, said septum being formed of a flexible material, said stake projecting upward from said planar surface of said valve seat within said internal space and connecting said first planar central portion of said septum to said base member, whereupon said first planar central portion of said septum contiguous with said stake is fixed in position with respect to said base member and said second planar portion of said septum engages said planar valve seat with said viscous fluid interposed between said second planar portion of said septum and said valve seat and covers and seals said at least one inlet port, said viscous fluid forming a releasably securable bond holding said septum in engagement with said valve seat, said septum being arranged so that said second planar portion of said septum is able to flex when the pressure of gas at said at least one inlet port reaches a threshold to overcome said releasably securable bond to cause said second portion of said septum to move away from said valve seat and open said at least one inlet port to allow the gas to enter into said interior of said valve and exit through the outlet, said second portion of said septum being arranged to automatically flex back onto said valve seat with said viscous fluid interposed therebetween to seal said at least one inlet port when the pressure of gas at said at least one inlet port drops below said threshold.

16. The package of claim 15 wherein said stake forms a portion of said base member and said septum includes a mounting aperture, said stake extending through said mounting aperture.

17. The package of claim 16 wherein said septum is held on said stake by secure frictional engagement between said first portion of said septum contiguous with said mounting aperture and a portion of said stake.

18. The package of claim 16 wherein said first portion of said septum is stretchable to enable said stake to be inserted therethrough.

19. The package of claim 16 wherein said stake includes a free end, said free end being of a greater size than the size of said mounting aperture.

20. The package of claim 15 additionally comprising a filter sheet located contiguous with said base member and extending over said at least one inlet port.

21. The package valve of claim 15 wherein said septum is formed of a thermoplastic vulcanizate.

22. The package of claim 15 wherein said stake forms a portion of said base member and said septum includes a mounting aperture, and wherein said stake projects into said interior space and extends through said mounting aperture.

23. The package of claim 22 wherein said base member is molded as an integral unit.

24. The package of claim 15 wherein said base member comprises a generally concave, conical surface forming said valve seat and wherein said at least one inlet port is located in said concave, conical surface.

25. The package of claim 24 additionally comprising a viscous fluid located at an interface of said valve seat and said septum and an annular ridge on said base member for holding said viscous fluid on said valve seat.

26. The package of claim 24 additionally comprising a viscous fluid located at an interface of said valve seat and said septum and an annular groove on said base member for holding said viscous fluid on said valve seat.

27. The package of claim 15 wherein said stake forms a portion of said septum and wherein said base member includes an opening into which a portion of said stake extends.

28. The package of claim 27 wherein said septum is of a convex shape.

29. The package of claim 15 wherein said septum has a modulus of elasticity of at least 0.2 Kpsi.

* * * * *